United States Patent [19]

Baker

[11] Patent Number: 4,749,258
[45] Date of Patent: Jun. 7, 1988

[54] LIQUID CRYSTAL OPTICAL CROSS POINT SWITCHING DEVICE

[75] Inventor: Anthony P. Baker, New York, N.Y.

[73] Assignee: Alcatel USA Corporation, New York, N.Y.

[21] Appl. No.: 795,148

[22] Filed: Nov. 5, 1985

[51] Int. Cl.$^4$ .......................... G02F 1/13; G02B 6/42
[52] U.S. Cl. ........................ 350/331 R; 350/96.14; 350/96.15; 350/96.16; 350/347 Y
[58] Field of Search ............. 350/331 R, 347 Y, 320, 350/96.14, 96.15, 96.16

[56] References Cited

U.S. PATENT DOCUMENTS 4,278,327 7/1981 McMahon et al. ............. 350/96.14
4,493,528 1/1985 Shaw et al. .................... 350/320

OTHER PUBLICATIONS

Soref, R., "Fiber-Optic Switching with Liquid Crystals," SPIE vol. 176, *Guided Wave Optical Systems and Devices II* (1979), pp. 124–132.

*Primary Examiner*—John K. Corbin
*Assistant Examiner*—Martin Lerner
*Attorney, Agent, or Firm*—Peter C. Van Der Sluys

[57] ABSTRACT

A liquid crystal optical cross point switching device includes first and second liquid crystal optical switches each characterized as having optical fibers spaced apart by liquid crystal material over a length thereof along which the cores of the fibers are exposed.

15 Claims, 3 Drawing Sheets

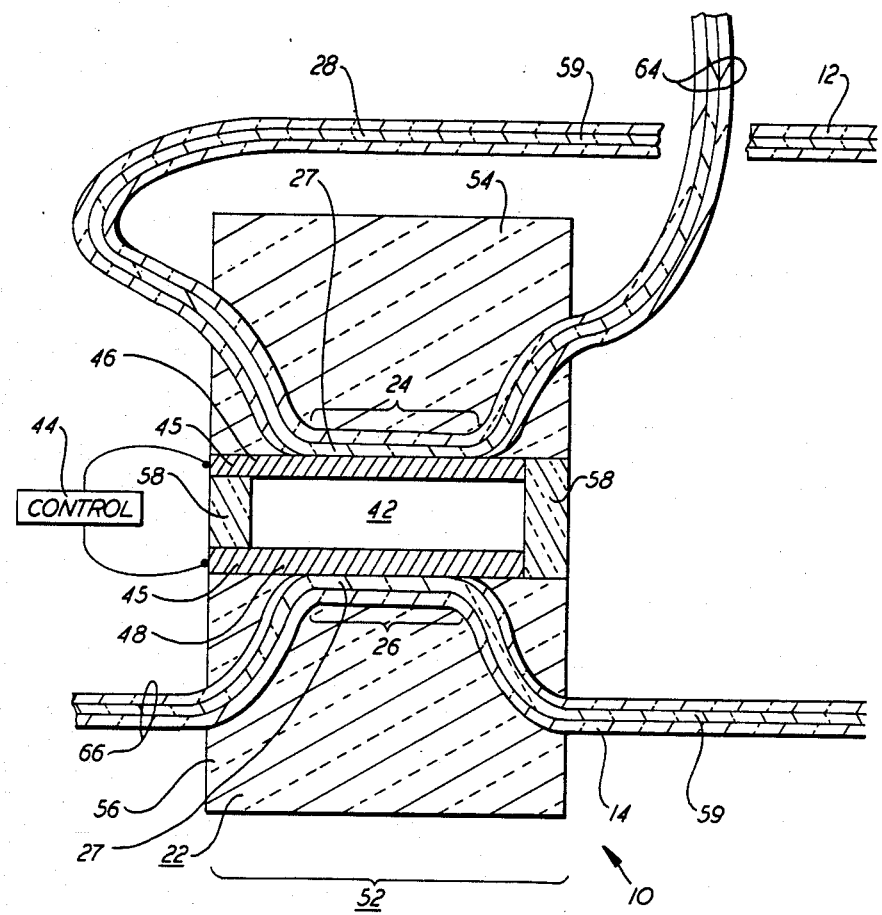
FIG. 1A
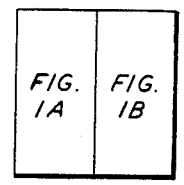

4,749,258

LIQUID CRYSTAL OPTICAL CROSS POINT SWITCHING DEVICE

CROSS-REFERENCE TO RELATED APPLICATIONS:

This application is related to one, or more, of the following U.S. patent applications: Ser. Nos. 795,156; 795,151; 595,150; 795,149; 795,155; 795,138; 795,157; 795,154; 795,152; 795,296, all filed on even date herewith.

BACKGROUND OF THE INVENTION

The present invention generally relates to a liquid crystal optical cross point switching device and, in particular, relates to such a device having exposed optical fiber cores disposed proximate a liquid crystal material.

One of the basic devices used in many communication systems is the so called "cross point switch". In principle, a cross point switch is a mechanism to simultaneously connect a pair of selected inputs to a pair of selected outputs. In the telephony field such a switch effects the connection of the pair of wires of each caller to the pair of wires of the party called to establish a telephone connection therebetween.

In practice, the cross point switch is most frequently used as one element of a larger cross point switching matrix for cross connecting a substantial number of pairs of signals in a communication network. Present technology usually implements the cross point switching function by, for example, means of semiconductor circuitry. Nonetheless, the basic function of a cross point switching matrix remains fundamental for many communication systems.

One of the current trends in telecommunications is the use of optical fibers in place of the more conventional transmission media. One advantage of optical fibers is the larger available bandwidth handling ability thereof thus providing the capability to convey larger quantities of information for a substantial number of subscribers via a media of considerably smaller size. Further, since light waves are shorter than, for example, microwaves a considerable reduction in component size is possible. As a result, a reduction in material, manufacturing and packaging costs is derived. Further, optical fibers do not emit any electromagntic or radio frequency radiation of consequence and, hence, have negligible impact on the surrounding environment. As an additional advantage, optical fibers are much less sensitive to extraneous radio frequency emissions from surrounding devices and systems.

The liquid crystal optical switching devices that have been proposed to date, however, are quite expensive, not only because the specific elements of the switching device but also because of the cost of manufacturing such switching devices. Typical of currently proposed liquid crystal optical switching devices are those described in U.S. Pat. No. 4,201,442 issued to McMahon et al. on May 6, 1980, U.S. Pat. No. 4,278,327 issued to McMahon et al. on July 14, 1981 and U.S. Pat. No. 4,385,799 issued to Soref on May 31, 1983.

These devices require expensive trapezoidal prisms having four optically flat surfaces. Further, during the manufacture of such devices, the opposing base surfaces of pairs of trapezoidal prisms must be very accurately aligned, thereby adding a considerable expense to the manufacturing procedure of such devices. Many of the difficulties and expenses incurred with these proposed liquid crystal switching devices have been overcome by devices discussed and described in U.S. patent application Ser. No. 795,156, entitled LIQUID CRYSTAL OPTICAL SWITCHING DEVICE and U.S. patent application Ser. No. 795,151, entitled LIQUID CRYSTAL OPTICAL SWITCHING DEVICE HAVING MINIMIZED INTERNAL LIGHT PATH, both filed on even date herewith. These latter two patent applications are incorporated herein by reference. Nevertheless, all of the above-referenced devices can generally be classified as "critical angle devices". That is, the inputs and outputs thereof must be arranged such that the light waves are conveyed into the device at, minimally, the critical angle with respect to the optical surface of the liquid crystal material. This, in itself, can be an expensive constraint in the manufacturing procedure of such liquid crystal optical switching devices.

Consequently, in order to more fully realize the advantages of an optical communications system there is a considerable need for a liquid crystal optical cross point switching device that does not depend on critical angle alignment.

SUMMARY OF THE INVENTION

Accordingly, it is one object of the present invention to provide a liquid crystal optical cross point switching device that does not depend on critical angle alignment, is relatively inexpensive and is amenable to mass production.

This object is accomplished, at least in part, by a liquid crystal cross point switching device including means for coupling first and second segments of first and second optical paths to effect a cross point switching arrangement.

Other objects and advantages will become apparent to those skilled in the art from the following detailed description read in conjunction with the appended claims and the drawings attached hereto.

BRIEF DESCRIPTION OF THE DRAWINGS

FIGS. 1A-1B are a cross sectional view, not drawn to scale, of a liquid crystal optical cross point switching device embodying the principles of the present invention.

DETAILED DESCRIPTION OF THE INVENTION

Figure 1B:
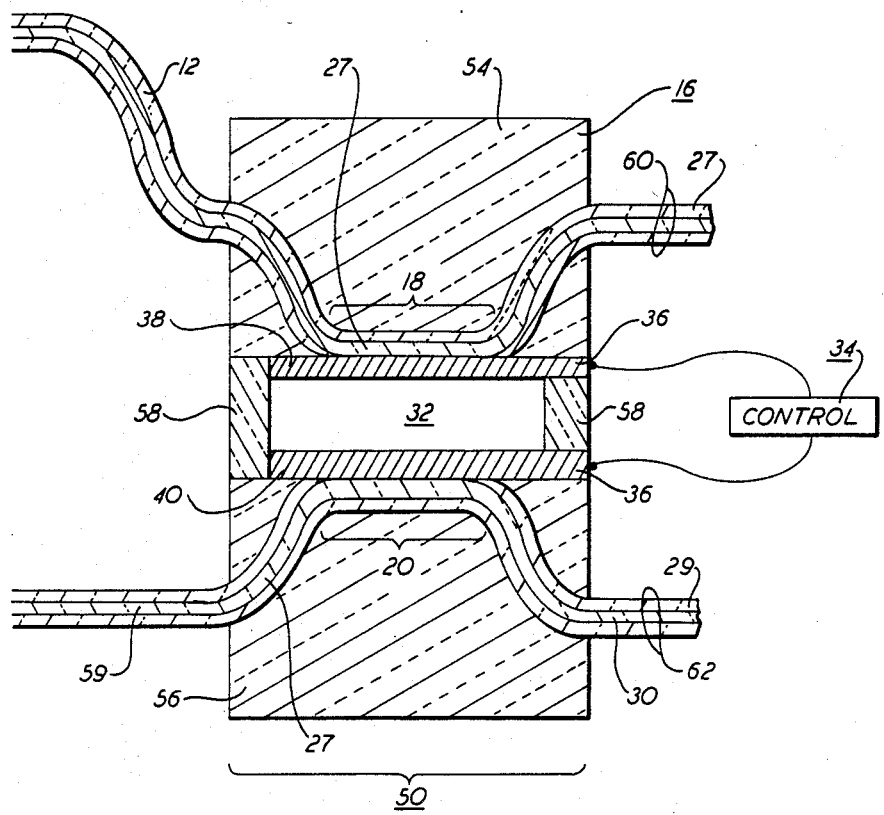

A liquid crystal optical cross point switching device, generally indicated at 10 in FIG. 1 and embodying the principles of the present invention, includes means 12 for providing a first optical path, means 14 for providing a second optical path, means 16 for selectively coupling a first segment 18 of the first optical path and a first segment 20 of the second optical path, and means 22 for selectively coupling a second segment 24 of the first optical path and a second segment 26 of the second optical path. The selective coupling means, 16 and 22, are cooperatively oriented so that, when the first and second optical paths are uncoupled, light traversing the segments, 18 and 20, or 24 and 26, of one of the selective coupling means, 16 or 22, respectively, is unidirectional and light traversing the segments, 24 and 26, or 18 and 20, of the other one of the selective coupling means, 22 or 16, respectively, is bidirectional.

In one particular embodiment, the means, 12 and 14, respectively, for providing the first and second light paths each include one or more lengths of optical fibers, 28 and 30 As more fully discussed below, the first segments, 18 and 20, and the second segments, 24 and 26, can be associated with individual lengths of optical fibers, 28 and 30. The lengths of optical fibers, 28 and 30, including the segments, 18, 20, 24 and 26, can then be interconnected to effect the first and second light paths. Preferably, the segments, 18, 20, 24 and 26, whenever coupling is effected, are exposed optical fiber cores 27 having the cladding 29 of the optical fiber lengths containing the segments, 18, 20, 24 and 26, removed on at least one side thereof.

The means 16 for selectively coupling the first segments, 18 and 20, in the preferred embodiment, includes a first liquid crystal material 32 disposed between the first segments, 18 and 20, and means 34 for selectively changing the opacity of the liquid crystal material 32. Preferably, the selective opacity changing means 34 includes means 36 for sustaining an electromagnetic field in the liquid crystal material 32. In one particular embodiment, more fully discussed below, the means 36 for sustaining an electromagnetic field is implemented via first and second electrodes, 38 and 40, respectively.

The means 22 for selectively coupling the second segments, 24 and 26, is, preferably, substantially identical to the means 16 and includes a second liquid crystal material 42 and means 44 for selectively changing the opacity of the second liquid crystal material 42. Preferably, the means 44 for selectively changing the opacity of the liquid crystal material includes means 45 for sustaining an electromagnetic field in the liquid crystal material 42. The means 45 includes first and second electrodes, 46 and 48, respectively.

In one specific embodiment, the means, 16 and 22, for coupling the first segments, 18 and 20, and second segments, 24 and 26, are first and second liquid crystal optical switching devices, 50 and 52, respectively. Preferably, the first and second liquid crystal optical switching devices, 50 and 52, respectively, are substantially structurally identical and, as such, only one of the switches is described in detail hereinafter. In such an embodiment the first liquid crystal optical switch 50 includes a first and second members, 54 and 56, respectively, each having an optical fiber retained therein, each optical fiber having a first end and a second end. The switch 50 further includes means 58 for retaining the liquid crystal material 32 between the first and second members, 54 and 56, respectively, and the means 36 for sustaining an electromagnetic field in the liquid crystal material 32. In one preferred embodiment, the liquid crystal optical switching device 50 adapted for use in the present liquid crystal optical cross point switching device 10 includes the first and second optical fibers, 28 and 30, having the cores 27 thereof exposed, i.e., the cladding 29 removed, the cores being disposed adjacent to liquid crystal material 32.

The cores 27 are exposed for a distance that is equal to or greater than the critical coupling length for the optical fibers, 28 and 30, used and are substantially directly opposite to each other across the liquid crystal material 32.

One liquid crystal optical switching device particularly adapted for use in the liquid crystal optical cross point switching device 10 is discussed and described in U.S. patent application Ser. No. 795,155, entitled LIQUID CRYSTAL OpTICAL SWITCHING DEVICE WITH INTEGRALLY ATTACHED OpTICAL FIBERS filed on even date herewith. This application is deemed incorporated herein by reference.

In the preferred embodiment, the means, 12 and 14, for providing light paths between the ends of the optical fibers, 28 and 30, of the first and second switching devices, 50 and 52, respectively, includes a length 59 of optical fiber connected on either end to the optical fibers of the first and second switching devices, 50 and 52, respectively, by conventional optical fiber connectors.

In operation, the liquid crystal optical cross point switching device 10 as described herein, essentially includes four ports 60, 62, 64 and 66, and is capable of simultaneously establishing connections for two light signals between any two of the ports and the remaining two ports. The port 60 is considered proximate first segment 18 of the first optical path while ports 62, 64 and 66 are considered to be proximate segments 20, 24 and 26, respectively. In such an embodiment, if both of the first and second liquid crystal switching devices, 50 and 52, respectively, are in a powered mode, i.e., an incoming light signal is coupled across the liquid crystal material, 32 and 42, then port 66 is coupled to port 64 and port 60 is coupled via the first switching device 50, to port 62. If, however, the first switching device 50 is in a powered mode when the second switching device 52 is in an unpowered mode, then port 60 is coupled to port 66 and port 62 is coupled to port 64. If the first switching device 50 is in an unpowered mode but the second switching device 52 is in a powered mode then port 60 is coupled to port 62 and port 64 is coupled to port 66. In the instance where both first and second switching devices, 50 and 52, respectively, are in an unpowered mode then port 60 is coupled to port 64 and port 62 is coupled to port 66.

As a consequence of such operational modes, signals entering any two of the ports can be simultaneously connected to the remaining ports.

Figure 2:
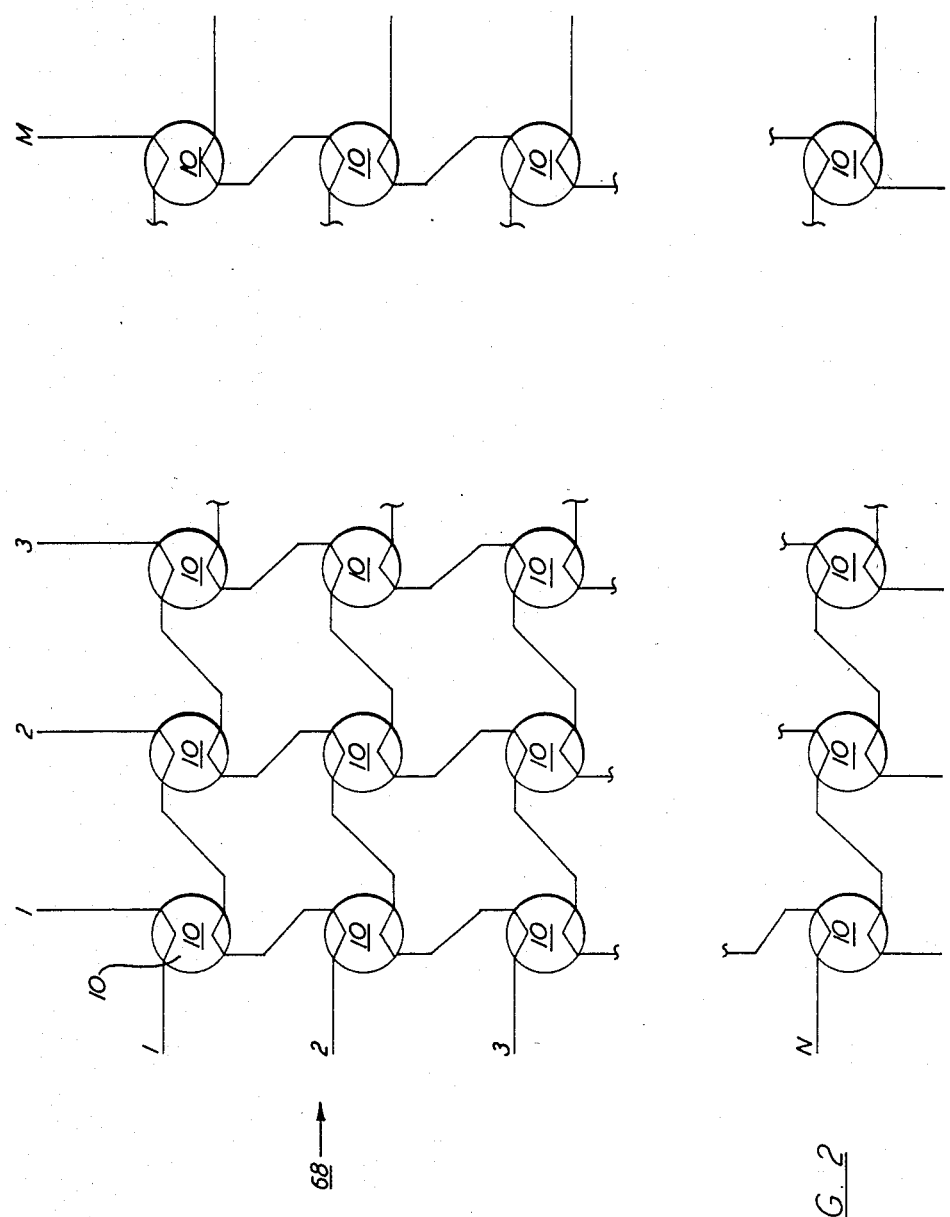
FIG. 2 is the schematic diagram of an NxM liquid crystal optical cross point switching matrix embodying the principles of the present invention.

A plurality of the liquid crystal optical cross point switching device 10 can be connected in a matrix, generally indicated at 68 in FIG. 2, to provide, for example, an N×M cross point switching matrix 68, each cross point switching device 10 thereof cross connecting two signals simultaneously. As shown in FIG. 2, each liquid crystal optical cross point switching device, represented by the numeral 10, via the matrix 68 interconnection, as shown, is capable of connecting any two signals from the N column to any two signals of the M rows.

As can be appreciated from FIG. 2, each first column port is proximate the second segment of the first optical path of its respective switching device and each first row port is proximate the first segment of the first optical path of its respective switching device. Furthermore, each last column port is proximate the first segment of the second optical path of its respective switching device and each last row port is proximate the second segment of the second optical path of its respective switching device.

One advantage of the present switching device 10 and the resultant matrix 68 is that they do not rely on the establishment and maintenance of a critical angle and additionally, transmit all signals by optical fiber, hence, avoiding losses due to the translation of an optical signal to an electrical signal for cross point switching and reconversion to an optical signal at the output of such an electronic, or electrical, cross point switching matrix 68.

Although the present invention has been shown via exemplary embodiments, other arrangements and configurations may also be derived that, nevertheless, do not depart from the spirit and scope of the present invention. Hence, the present invention is deemed limited only by the appended claims and the reasonable interpretation thereof.

What is claimed is:

1. A liquid crystal optical cross point switching device; said device comprises:
   means for establishing a first optical path, said first optical path having first and second spaced apart segments;
   means for establishing a second optical path, said second optical path having first and second spaced apart segments;
   means for selectively coupling said first segments; and
   means for selectively coupling said second segments, said first segment coupling means and said second coupling means being cooperatively disposed such that, when said first segments and said second segments are uncoupled, light traversing said segments of one of said coupling means is unidirectional and light traversing said segments of the other one of said coupling means is bidirectional.

2. Device as claimed in claim 1 wherein said first optical path establishing means includes at least one length of a first optical fiber and said second optical path establishing means includes at least one length of a second optical fiber.

3. Device as claimed in claim 1 wherein said first and second segments of said first and second optical path establishing means includes exposed cores of optical fibers.

4. Device as claimed in claim 3 wherein each said selective coupling means further comprises:
   a liquid crystal material, said liquid crystal material being disposed between said segments associated with each said coupling means; and
   means for selectively changing the opacity of said liquid crystal material.

5. Device as claimed in claim 4 wherein said opacity changing means includes:
   means, associated with said first segments, for sustaining an electromagnetic field in said liquid crystal material therebetween; and
   means, associated with said second segments, for sustaining an electromagnetic field in said liquid crystal material therebetween.

6. Device as claimed in claim 5 wherein each said electromagnetic field sustaining means includes first and second spaced apart electrodes.

7. Device as claimed in claim 3 wherein said first and second segments of said first optical path are associated with two different lengths of optical fiber material and said first and second segments of said second optical path are associated with two other different lengths of optical fiber material.

8. Device as claimed in claim 7 wherein each of said lengths of optical fiber material is fixedly positioned within a different member such that each said exposed core of each said segment is substantially coplanar with one surface of said member associated therewith.

9. Device as claimed in claim 1 wherein said first segment selective coupling means in a first liquid crystal optical switching device and said second segment selective coupling means is a second liquid crystal optical switching device.

10. Device as claimed in claim 9 wherein said first and second liquid crystal optical switching devices are substantially identical to each other.

11. Device as claimed in claim 9 wherein said first and said second liquid crystal optical switching devices are interconnected by means of lengths of optical fibers.

12. A liquid crystal optical cross point switching matrix; said matrix comprises:
    a plurality of liquid crystal optical cross point switching devices, each said device including; means for establishing a first optical path, said first optical path having first and second spaced apart segments; means for establishing a second optical path, said second optical path having first and second spaced apart segments; means for selectively coupling said first segments; means for selectively coupling said second segments, said first segment coupling means and said second coupling means being cooperatively disposed such that, when said first segments and said second segments are uncoupled, light traversing said segments of one of said coupling means is unidirectional and light traversing said segments of the other one of said coupling means is bidirectional; and
    means for interconnecting said plurality of liquid crystal optical cross point switching devices such that an NxM matrix is formed whereby any two N ports can be selectively cross connected to any two M ports.

13. Matrix as claimed in claim 12 wherein each first column port is proximate said second segment of said first optical paht of its respective switching device and each first row port is proximate said first segment of said first optical path.

14. Matrix as claimed in claim 13 wherein each last column port is proximate said first segment of said second optical path of its respective switching device and each last row port is proximate said second segment of said second optical path.

15. A liquid crystal optical cross point switching device; said device comprises:
    a first liquid crystal optical switching device having first and second optical fibers, said first and second optical fibers being opposed and spaced apart and having liquid crystal material therebetween, said first and second optical fibers having the cores thereof exposed to said liquid crystal material, said first device including means for sustaining an electromagnetic field across said liquid crystal material, said first optical fiber defining first and second ports, said second optical fiber defining third and fourth ports, said first and fourth ports being diagonally disposed across said liquid crystal material;
    a second said liquid optical crystal switching device having third and fourth optical fibers opposed and spaced apart from each other and having liquid crystal material therebetween, said third and fourth optical fibers having the cores thereof exposed to said liquid crystal material, said second device including means for sustaining an electromagnetic field across said liquid crystal material, said third optical fiber defining a fifth and sixth port, said fourth optical fiber defining a seventh and eighth port, said fifth and eighth ports being diagonally disposed across said liquid crystal material of said second liquid crystal optical switching device;
means for connecting said first port with said fifth port; and
means for connecting said fourth port with said seventh port whereby said second, third, sixth and eighth ports provide two input and two output ports.

* * * * *